Patented Nov. 7, 1950

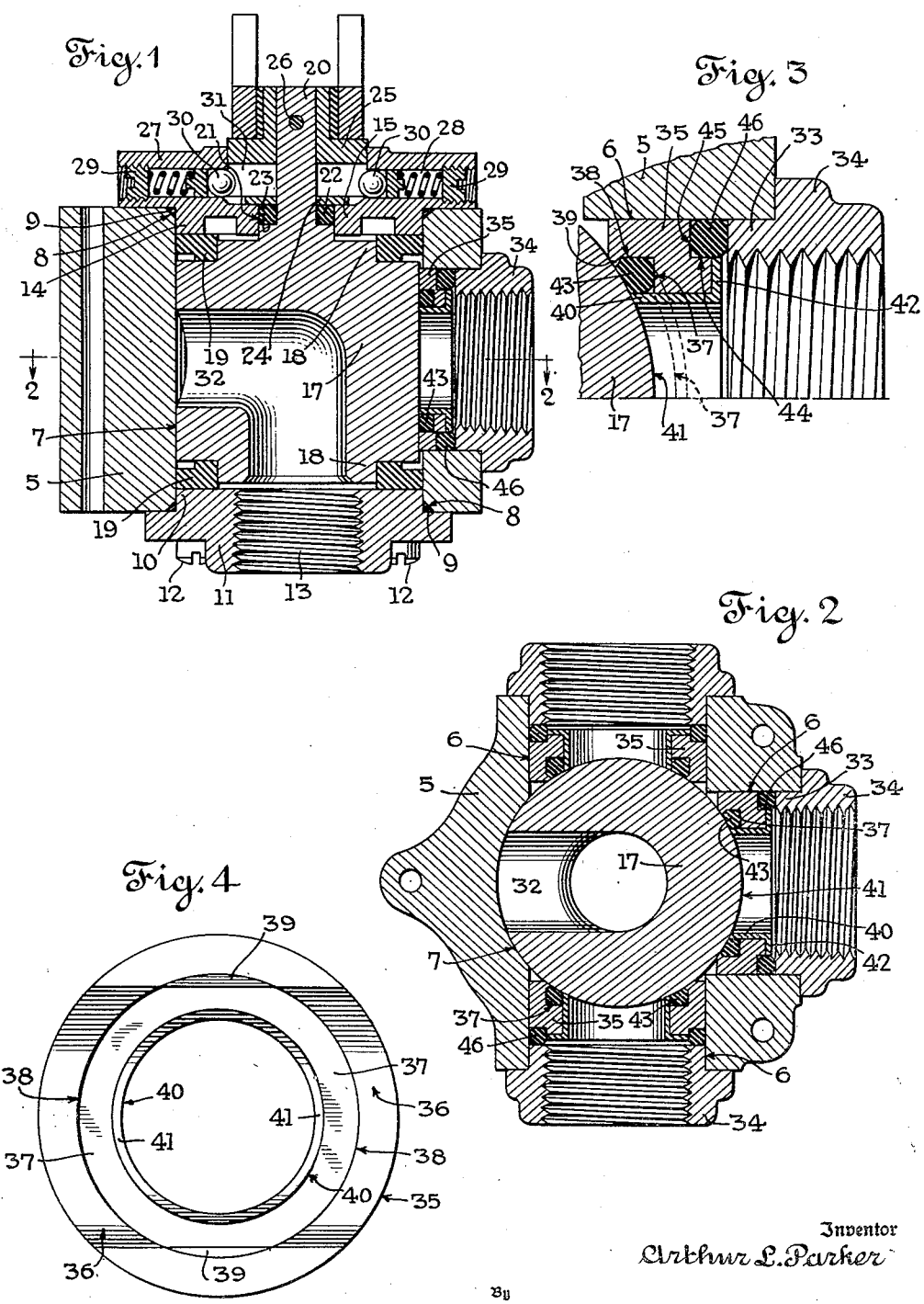

2,529,412

UNITED STATES PATENT OFFICE 2,529,412

VALVE ASSEMBLY

Arthur L. Parker, Cleveland, Ohio, assignor to The Parker Appliance Company, Cleveland, Ohio, a corporation of Ohio Application December 8, 1944, Serial No. 567,178

9 Claims. (Cl. 251—113)

The invention relates generally to valves and primarily seeks to provide a novel valve structure embodying a casing having at least one inlet port and at least one outlet port, a rotor having a flow passage therethrough and turnable for permitting or preventing flow of fluid through said ports and passage, sealing ring means carried by the casing and surrounding a port therein and yieldably engaging the rotor for sealing off the ring surrounded port when the rotor is turned so as to place the flow passage therein out of registry with said ring surrounded port, and novel means for preventing pinching of the sealing ring means between the rotor and the casing as the flow passage in the rotor is moving past said ring means.

In employment of valve structures of the character stated, examples of which are disclosed in the application for U. S. Letters Patent filed by Arthur L. Parker on April 8, 1944, and identified by Serial Number 530,172, now Patent No. 2,485,915, issued October 25, 1949, it has been noted that there is a tendency for the sealing ring means to project from its mounting groove in the casing and become pinched between the rotor and the casing as the flow passage in the rotor moves past said ring means. This is caused in part by frictional contact between the rotor and the sealing ring means and resulting pressure of the ring means against wall portions of the mounting groove bearing such angular relation to the direction of force application as to tend to crowd the sealing means out of the mounting groove and into the passing rotor flow passage. Obviously such pinching of the sealing ring means is objectionable, and this problem is subject to only partial solution by providing clearances and rounded edges at critical points on the rotor or casing. It is a purpose of the present invention to provide novel means for preventing this objectionable pinching of the port sealing rings.

This problem of pinching of sealing rings has been relieved to a large extent by provision of ring retaining lips formed directly on the casing wall portions surrounding the ports and the ring mounting means, as in the structure disclosed in the copending application for U. S. Letters Patent Serial Number 539,513, now Patent No. 2,419,481, issued April 22, 1947, filed by Harry B. Carbon on June 9, 1944, but such lips are not only somewhat difficult to form but also are subject to being damaged with resultant impairment of the usefulness of the whole casing. Structures of this type employ port adapters and rings forming followers or mounting means for the sealing rings, and some difficulty has been experienced in preventing the leakage between the follower or mounting rings and the casing, and between the casing and the port adapters. Obviously the sealing ring pinching and also the leakage referred to are objectionable, and it is the purpose of the present invention to provide novel sealing ring carrier means including sealing ring mounting and retaining devices and also supplementary sealing means for preventing leakage between the casing and the carrier means and also between the casing and the port adapters.

Another object of the invention is to provide novel sealing ring carrier means of the character stated in which the leakage preventing means comprises a sealing ring so mounted as to serve not only to prevent leakage as aforesaid, but also to constantly and yieldably urge the carrier means toward the valve rotor so as to press the first mentioned sealing ring thereagainst.

With the above and other objects in view that will hereinafter appear, the nature of the invention will be more clearly understood by reference to the following detailed description, the appended claims, and the several views illustrated in the accompanying drawings.

In the drawings:

Figure 1 is a vertical cross sectional view illustrating a valve structure embodying the invention.

Figure 2 is a horizontal section taken on the line 2—2 on Figure 1.

Figure 3 is an enlarged fragmentary sectional view illustrating a portion of the valve casing, the rotor, one port adapter and the carrier ring and the sealing rings carried thereby.

Figure 4 is an inner face view of one of the carrier rings with the sealing ring removed from the face groove therein.

In the disclosure herein presented exemplifying the invention, the novel features are shown as incorporated in a valve in which the casing has three inlet or delivery ports arranged in a common horizontal plane and a single downwardly directed inlet or outlet port, and the rotor has an elbow flow passage turnable into registry with a selected one of the group of three ports for bringing about flow communication between the selected one of the three ports and the downwardly directed port, or the rotor can be turned to close off communication with all three of the horizontally disposed ports. It is to be understood that the invention can be applied as well to various other forms of valve structures.

In the form of the invention herein disclosed, the valve structure includes a casing 5 having three radially disposed bores 6 all arranged in a common horizontal plane. Each of the bores 6 open into a large cylindriform rotor bore 7, and each end of the rotor bore is chamfered as at 8 to provide a seat for a sealing ring 9. The sealing ring at the bottom of the valve surrounds a boss 10 extending from a closure cap 11 which is screw secured as at 12 to said casing and which holds the ring in tight sealing contact with its seat. The cap 11 is equipped with a central inlet or discharge port 13.

The sealing ring or gasket 9 at the top of the valve surrounds a boss 14 extending from a closure cap 15 which is screw secured to the casing, and the boss 14 like the previously mentioned cap boss 10, extends into the respective end of the rotor bore 7.

A valve rotor 17 is freely rotatably mounted in the rotor bore 7 and is equipped with bearing hubs 18 at the respective ends thereof which are rotatably received in non-metallic bearing rings 19 mounted in the casing in a manner clearly illustrated in Figure 1. The rotor includes a reduced diameter stem extension 20 which passes through a center bore 21 in the cap 15 wherein it is surrounded by a packing ring 22 disposed between the stem shoulder 23 and an abutment ring 24 surrounding the same in spaced relation to said shoulder.

The cap 15 also has a counterbore within which is received the collar 25 which is pin secured as at 26 upon the end of the rotor stem which extends out of the casing. The cap 15 also is equipped with a raised rib 27 having a longitudinal bore 28 therethrough in each end of which is threadably mounted an abutment screw 29 and a spring pressed ball or detent 30. Each ball or detent 30 is engageable in a recess 31 formed in the external surface of the collar 25, four such recesses being provided in equidistantly spaced relation. The spring pressed elements 30 serve to yieldably hold the rotor in selected positions or stations each disposed in 90° spaced relation about the rotor center.

The rotor 17 is provided with an elbow flow passage 32 which constantly communicates with the casing bottom port 13 at one end and has its other end presented for selective communication with the several casing port bores 6. The yieldable detent and recess equipments 30, 31 will yieldably retain the rotor in the off position in which its flow passage 32 will be out of communication with all of the casing ports as in Figures 1 and 2, or it will be yieldably held in position for registering with any selected one of the casing ports.

Into the outer end of each casing bore 6 is fitted the positioning boss 33 of a port adapter 34 which is screw secured to the casing.

In each cylindrical port bore 6 there is mounted a sealing means comprising a carrier ring 35 dimensioned to be snugly slidable in the bore 6 in which it is mounted and having its inner face or edge portion shaped at 36 to conform to the curvature of the opposing peripheral surface of the rotor 17. See Figure 4. Said ring end or face is provided with an annular groove defined in part by a transverse or radial wall 37 arranged perpendicularly with respect to the respective port axis and conforming to and being concentrically spaced from the rotor periphery as indicated by the dotted lines in Figure 3. Each said ring face groove also includes a circumferential or outer wall 38 which is concentric to the bore axis, and at each side of each ring this wall merges into an overhanging retainer lip 39. The diametrically oppositely disposed lips 39 restrict the outlet from the carrier ring face groove in combination with the inner end portion of a port defining sleeve 40 which is press-fitted or otherwise secured within the respective carrier ring 35 with its inner end extending inwardly beyond the bottom wall 37 of the groove so as to form the inner wall of said groove. The extended inner end of each sleeve 40 is shaped to conform to the curvature of the opposing peripheral portion of the rotor 17 in the manner clearly illustrated in Figures 3 and 4. Thus each complete carrier ring edge or face groove is defined by an outer wall 38, an inner wall 40 and a bottom wall 37, and is restricted by two diametrically oppositely disposed retainer lips 39. Each port defining sleeve 40 preferably is provided with a transversely and outwardly bent flange 42 at its outer end disposed to contact the outer end of the respective ring 35 and prevent any possibility of the sleeve moving inwardly toward the rotor beyond its intended position.

A sealing ring 43 is mounted in the inner face or edge groove in each carrier ring 35. Each sealing ring is formed of rubber or an equivalent yieldable sealing material and is retained in the respective groove by the retaining lips 39 with a portion thereof extending beyond the groove in tight sealing contact with the periphery of the rotor 17.

A peripheral clearance 44 is provided at the outer end of each carrier ring 35, each said clearance providing a step shoulder 45. A second sealing ring 46 is mounted in each carrier ring clearance 44 and against the step shoulder 45 thereof, and it will be apparent by reference to Figures 1, 2 and 3 of the drawings that when the carrier rings are properly mounted in the cylindrical port bores 6 of the casing, each said ring 46 will be tightly pressed or deformed against the respective clearance wall 44, the respective step shoulder 45, the respective port bore 6 and the inner wall of the respective port adapter boss 33. In this manner, each ring 46 serves the three-fold function of sealing the adapter to prevent leakage between the adapter and the casing, of sealing the carrier ring 35 to prevent leakage between said carrier ring and the casing port bore 6, and also of operating as a pressure member effective to yieldably press the carrier ring and the sealing ring 43 carried thereby against the periphery of the rotor 17.

The provision of the sealing ring retaining lips 39, and the angular relation of the inner extremities of the port defining sleeves 40 with relation to the opposing peripheral surfaces of the rotor 17 serve to prevent pinching of the rings 43. The depth of the carrier ring face grooves in which the sealing rings 43 are mounted is only slightly less than the cross section of the rings 43 so that said rings will engage in tight sealing contact with the peripheral surface of the rotor 17, and the carrier ring 35 and its sleeve extension 40 will also engage said rotor to completely close the ring carrying groove and further minimize pinching of the ring between the rotor and the casing. It will also be apparent that by making the groove bottom walls 37 perpendicular to the axes of the respective ports and concentric to the rotor axis, and the other groove defining portions concentric to said port axes, sealing ring mounting grooves of nearly uniform cross sectional area about the whole circle of the grooves are provided, thereby assuring a more nearly uniform squeezing or deformation of the sealing rings 43 throughout the whole circle thereof.

While one form of the invention has been shown for purposes of illustration, it is to be clearly understood that various changes in the details of construction and arrangement of parts may be made without departing from the spirit and scope of the invention as defined in the appended claims.

I claim:

1. In a valve assembly, a casing having a rotor bore and at least one cylindrical port bore leading thereinto, a rotor rotatably mounted in the rotor bore and having a flow passage therein and turnable for permitting or preventing flow of fluid through said port bore and passage, and port defining and sealing means in said port bore comprising a carrier ring removably mounted in the port bore and having one end thereof presented toward and conforming in shape to the adjacent portion of the rotor and equipped with an annular groove, a sealing ring of yieldable material mounted in and extending from said groove in sealing contact with said adjacent rotor portion, a port adapter having a boss extending into the port bore adjacent the other end of the carrier ring, and sealing means carried by the carrier ring and engaging in sealing contact with the carrier ring, the port bore and said boss for preventing leakage through the port bore past the carrier ring or the port adapter.

2. In a valve assembly, a casing having a rotor bore and at least one cylindrical port bore leading thereinto, a rotor rotatably mounted in the rotor bore and having a flow passage therein and turnable for permitting or preventing flow of fluid through said port bore and passage, and port defining and sealing means in said port bore comprising a carrier ring removably mounted in the port bore and having one end thereof presented toward and conforming in shape to the adjacent portion of the rotor and equipped with an annular groove, a sealing ring of yieldable material mounted in and extending from said groove in sealing contact with said adjacent rotor portion, and sealing means engaging between the carrier ring and the port bore for preventing leakage through the port bore past the carrier ring, said carrier ring having lip projections restricting the outlet from its groove and serving to retain the sealing ring therein.

3. In a valve assembly, a casing having a rotor bore and at least one cylindrical port bore leading thereinto, a rotor rotatably mounted in the rotor bore and having a flow passage therein and turnable for permitting or preventing flow of fluid through said port bore and passage, and port defining and sealing means in said port bore comprising a carrier ring removably mounted in the port bore and having one end thereof presented toward and conforming in shape to the adjacent portion of the rotor and equipped with an annular groove, a sealing ring of yieldable material mounted in and extending from said groove in sealing contact with said adjacent rotor portion, a port adapter having a boss extending into the port bore adjacent the other end of the carrier ring, and sealing means carried by the carrier ring and engaging in sealing contact with the carrier ring, the port bore and said boss for preventing leakage through the port bore past the carrier ring or the port adapter, said carrier ring having lip projections restricting the outlet from its groove and serving to retain the sealing ring therein.

4. In a valve assembly, a casing having a rotor bore and at least one cylindrical port bore leading thereinto, a rotor rotatably mounted in the rotor bore and having a flow passage therein and turnable for permitting or preventing flow of fluid through said port bore and passage, and port defining and sealing means in said port bore comprising a carrier ring removably mounted in the port bore and having one end thereof presented toward and conforming in shape to the adjacent portion of the rotor and equipped with an annular groove, a sealing ring of yieldable material mounted in and extending from said groove in sealing contact with said adjacent rotor portion, a port adapter having a boss extending into the port bore adjacent the other end of the carrier ring, said carrier ring having a peripheral clearance at said other end providing a reduced diameter sealing ring receiving wall and a step shoulder opposing said boss, and a second sealing ring surrounding said reduced diameter wall and deformed between said wall, the port bore the step shoulder and said boss for preventing leakage through the port bore past the carrier ring or the port adapter and for constantly urging the carrier ring and the other sealing ring toward the rotor.

5. In a valve assembly, a casing having a rotor bore and at least one cylindrical port bore leading thereinto, a rotor rotatably mounted in the rotor bore and having a flow passage therein and turnable for permitting or preventing flow of fluid through said port bore and passage, and port defining and sealing means in said port bore comprising a carrier ring removably mounted in the port bore and having one end thereof presented toward and conforming in shape to the adjacent portion of the rotor and equipped with an annular groove, a sealing ring of yieldable material mounted in and extending from said groove in sealing contact with said adjacent rotor portion, and sealing means engaging between the carrier ring and the port bore for preventing leakage through the port bore past the carrier ring, said carrier ring having lip projections restricting the outlet from its groove and serving to retain the sealing ring therein and having its annular groove defined in part by an outer wall bearing concentric relation to the port bore axis and by a bottom wall disposed perpendicularly with respect to said axis and concentrically with respect to the rotor axis.

6. In a valve assembly, a casing having a rotor bore and at least one cylindrical port bore leading thereinto, a rotor rotatably mounted in the rotor bore and having a flow passage therein and turnable for permitting or preventing flow of fluid through said port bore and passage, and port defining and sealing means in said port bore comprising a carrier ring removably mounted in the port bore and having one end thereof presented toward and conforming in shape to the adjacent portion of the rotor and equipped with an annular groove, a sealing ring of yieldable material mounted in and extending from said groove in sealing contact with said adjacent rotor portion, a port adapter having a boss extending into the port bore adjacent the other end of the carrier ring, and sealing means carried by the carrier ring and engaging in sealing contact with the carrier ring, the port bore and said boss for preventing leakage through the port bore past the carrier ring or the port adapter, said carrier ring having lip projections restricting the outlet from its groove and serving to retain the sealing ring therein and having its annular groove defined in part by an outer wall bearing concentric relation to the port bore axis and by a bottom wall disposed perpendicularly with respect to the rotor axis.

7. In a valve assembly, a casing having a rotor bore and at least one cylindrical port bore leading thereinto, a rotor rotatably mounted in the rotor bore and having a flow passage therein and turnable for permitting or preventing flow of fluid through said port bore and passage, and port defining and sealing means in said port bore comprising a carrier ring removably mounted in the port bore and having one end thereof presented toward and conforming in shape to the adjacent portion of the rotor and equipped with an annular groove, and a sealing ring of yieldable material mounted in and extending from said groove in sealing contact with said adjacent rotor portion, the inner wall of said annular groove being defined by a sleeve defining a port and including an outwardly turned flange portion abutting the other end of the carrier ring.

8. In a valve assembly, a casing having a rotor bore and at least one cylindrical port bore leading therein, a rotor rotatably mounted in the rotor bore and having a flow passage therein and turnable for permitting or preventing flow of fluid through said port bore and passage, and port defining and sealing means in said port bore comprising a carrier ring removably mounted in the port bore and having one end thereof presented toward and conforming in shape to the adjacent portion of the rotor and equipped with an annular groove, a sealing ring of yieldable material mounted in and extending from said groove in sealing contact with said adjacent rotor portion, the inner wall of said annular groove being defined by a sleeve defining a port and including an outwardly turned flange portion abutting the other end of the carrier ring, a port adapter having a boss extending into the port bore adjacent the other end of the carrier ring, and sealing means carried by the carrier ring and engaging in sealing contact with the carrier ring, the port bore and said boss for preventing leakage through the port bore past the carrier ring or the port adapter.

9. In a valve assembly, a casing having a rotor bore and at least one cylindrical port bore leading thereinto, a rotor rotatably mounted in the rotor bore and having a flow passage therein and turnable for permitting or preventing flow of fluid through said port bore and passage, and port defining and sealing means in said port bore comprising a unitary bodily removable carrier and sealing ring structure including a carrer ring having one end thereof presented toward and curved to conform in shape to the adjacent portion of the rotor and equipped with an annular groove spaced inwardly from said cylindrical port bore, a sealing ring of yieldable material mounted in said groove and engaging in sealing contact with said adjacent rotor portion, and a sealing ring of yieldable material mounted on the carrier ring and engaging between the carrier ring and the cylindrical port bore for preventing leakage through the port bore past the carrier ring, said groove being defined in part by a sleeve mounted in abutting relation with the carrier ring and serving to close one side of the groove.

ARTHUR L. PARKER.

REFERENCES CITED

The following references are of record in the file of this patent:

UNITED STATES PATENTS

| Number | Name | Date |
|---|---|---|
| 934,614 | Huxley | Sept. 21, 1909 |
| 1,062,064 | Ward | May 20, 1913 |
| 1,954,018 | Miller | Apr. 10, 1934 |
| 2,030,458 | McKellar | Feb. 11, 1936 |
| 2,283,985 | Grant | May 26, 1942 |
| 2,383,983 | Melichar | Sept. 4, 1945 |